3,135,745
HETEROCYCLIC DERIVATIVES OF DIARYLETH-
ANES AND DIARYLETHYLENES II
Frank P. Palopoli, 4113 Judd Drive, and Harvey D. Benson, 11144 Mulligan St., both of Cincinnati, Ohio; Robert E. Allen, 2010 Blackwood Drive, Walnut Creek, Calif.; and Edward L. Schumann, 3021 Fleetwood Drive, Kalamazoo, Mich.
No Drawing. Filed Oct. 17, 1961, Ser. No. 145,762
6 Claims. (Cl. 260—240)

This invention relates to new chemical compounds which have useful physiological and other valuable properties.

The new compounds of the present invention are heterocyclic and cycloalkyl derivatives of diarylethylenes and diarylethanes. They may be represented by the following formula:

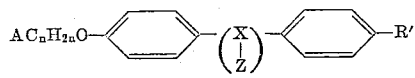

in which X is an ethane

or ethylene

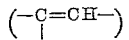

A is a dialkylamino group in which the alkyl groups have from 1 to 4 carbon atoms or a heterocyclic group such as morpholino and piperidino, $n$ is an integer from 2 to 4 inclusive, R' is hydrogen, lower alkyl, halogen or lower alkoxy, and Z is a heterocyclic group such as piperidyl, N-methylpiperidyl, or a cycloalkyl group such as cyclohexyl. Acid addition salts, quaternary ammonium salts and the N-oxides of these compounds may also be prepared by known methods and are included within the scope of the present invention.

The ethylene derivatives of the present invention may be prepared by dehydration of the corresponding ethanols. Preparation of the ethanols is described in our co-pending application Serial No. 843,630, filed October 1, 1959, now abandoned, of which this is a continuation-in-part. As will be apparent from the disclosure of that application, the heterocyclic group represented by Z may be attached to the carbon atom bearing the hydroxy group or to the adjacent carbon atom of the ethylenic moiety. To prepare the novel ethanols in which the heterocyclic group is on the alcoholic carbon atom, a suitably substituted benzyl magnesium halide is reacted with a heterocyclic phenyl ketone having the —OC$_n$H$_{2n}$A group on the para position of the phenyl radical. To prepare ethanols in which the heterocyclic group is on the carbon atom adjacent to the hydroxyl bearing carbon atom, a suitably substituted lithium heterocyclic or cycloalkyl derivative is reacted with a benzophenone having a —OC$_n$H$_{2n}$A group at the para position on one of the benzene rings as illustrated in the specific examples of Serial No. 843,630.

The novel ethylenes of the present invention are made by dehydrating one of the just described ethanols. The dehydration takes place very readily and in some instances will take place at room temperature in the presence of small amounts of an acid such as hydrochloric, sulfuric, hydrobromic, phosphoric, paratoluenesulfonic and the like.

The novel ethanes of the present invention may be prepared by hydrogenation of the corresponding ethylene derivatives as will be described in the specific examples.

The N-oxides of the ethanol and ethane derivatives are prepared by oxidation of these derivatives with hydrogen peroxide. The N-oxides of the ethylene derivatives are obtained by dehydration of the N-oxides of the ethanol derivatives.

The new compounds are basic and may be used as either the free bases or as acid addition salts or quaternary ammonium salts of these bases. These acid addition salts include the hydrochloride, hydrobromide, citrate, succinate, phosphate, sulfate, glycolate, acetate, malonate, maleate, and other pharmaceutically suitable salts.

The compounds of the present invention are characterized by having valuable physiological properties the most useful of which is their anti-inflammatory activity which makes them useful in reducing inflammation and edema as in the treatment of rheumatoid arthritis and other collagen diseases, gouty arthritis, neuralgia, bursitis, conjunctivitis and the like. Some of the new compounds have antifungal activity and are of value in the treatment of epidermal fungal infections. Some of the new compounds also have uterotrophic activity and are useful in functional uterine disorders. Many of the new compounds of the present invention are also active in depressing the cholesterol levels in tissues and serum, and others have an adrenal regulatory activity which makes them useful in controlling blood pressures. The principal specific physiological activity of these compounds is indicated in the specific examples which follow.

The new compounds may be administered orally in tablet or other suitable form, parenterally, e.g. intravenously, or topically in an ointment. The dosage range will vary depending upon the mode of administration and intended use, varying from 25 milligrams to 2.5 grams daily when given orally, 0.1 milligram to 1.5 grams daily when given parenterally, and in concentrations of 1 to 10 percent when used in ointments.

EXAMPLE I

1-[p-(β-Diethylaminoethoxy) Phenyl]-1-Cyclohexyl-2-p-Anisylethylene

A solution of alcoholic hydrogen chloride was added to a chloroform solution of 1-[p-(β-diethylaminoethoxy)]-1-cyclohexyl-2-p-anisylethanol and the resulting solution was heated under reflux for thirty minutes. The cooled solution was washed with dilute sodium hydroxide solution and the organic layer was separated, dried and the solvent was removed under reduced pressure, leaving 1 - [p - (β - diethylaminoethoxy)phenyl] - 1 - cyclohexyl-2-p-anisylethylene as an oil, which formed a dihydrogen citrate salt, melting with decomposition at 104–105° C. This compound possesses antifungal activity.

EXAMPLE II

1-[p-(β-Diethylaminoethoxy)Phenyl]-1-Phenyl-2-(1-Methyl-4-Piperidyl)Ethylene

Twenty-five grams of 1-[p-(β-diethylaminoethoxy)-phenyl]-1-phenyl-2-(4-pyridyl)ethanol hydrochloride was hydrogenated at sixty pounds of hydrogen using platinum oxide catalyst. The catalyst was removed, and the product, 1-[p-(β-diethylaminoethoxy)phenyl]-1-phenyl-2-(4-piperidyl)ethanol, a viscous oil, was dehydrated by warming at steam bath temperature with 30 ml. of 85 percent phosphoric acid. The reaction mixture was diluted with water and made alkaline with twenty percent sodium hydroxide solution. The oil which separated was dissolved in ether and dried. The product, 1-[p-(β-diethylaminoethoxy)phenyl] - 1 - phenyl-2-(4-piperidyl)ethylene, was obtained as an oil.

A mixture of 13 g. of the ethylene, 8 g. of forty percent formalin, 24 g. of 98 percent formic acid and 24 ml. of water was heated under reflux for thirty hours. The reaction mixture was diluted to 100 ml. with water and made alkaline with 20 percent sodium hydroxide solution.

The product, 1-[p-(β-diethylaminoethoxy)phenyl]-1-phenyl-2-(1-methyl-4-piperidyl)ethylene, was obtained as an oil which formed a di-acid oxalate, melting with decomposition at 154° C.

This compound possesses anti-inflammatory activity.

EXAMPLE III

*1-[p-(β-Diethylaminoethoxy)Phenyl]-1-Cyclohexyl-2-p-Anisylethane*

Seventeen and a half grams of 1-[p-(β-diethylaminoethoxy)phenyl] - 1 - cyclohexyl-2-p-anisylethylene was dissolved in 150 ml. of ethanol and 2 ml. of concentrated hydrochloric acid added. This solution was hydrogenated to sixty pounds of hydrogen pressure using platinum oxide catalyst. After theoretical amount of hydrogen was absorbed, the catalyst was removed by filtration and the solvent evaporated. The residue was dissolved in water, made basic with dilute sodium hydroxide and extracted with ether. The ether was dried, filtered and the solvent removed. 1-[p-(β-diethylaminoethoxy)phenyl]-1-cyclohexyl-2-p-anisylethane was obtained as an oil which formed a citric acid salt, melting with decomposition at 99°–100° C.

This compound possesses anti-inflammatory activity.

EXAMPLE IV

*1-[p-(β-Diethylaminoethoxy)Phenyl]-1-Phenyl-2-(1-Methyl-4-Piperidyl)Ethane*

A. 1-[p-(β-diethylaminoethoxy)phenyl]-1-phenyl-2-(4-pyridyl)ethanol (25 g.) was dehydrated by the procedure of Example I. The residue was hydrogenated using platinum oxide catalyst and low pressure hydrogen. After a theoretical amount of hydrogen had been absorbed, the catalyst was removed by filtration and the solvent evaporated on the steam bath. The residue was dissolved in water, made basic with dilute sodium hydroxide and extracted with ether. The ether was dried and the solvent removed. The product, 1-[p-(β-diethylaminoethoxy)phenyl]-1-phenyl-2-(4-piperidyl)ethane, was obtained as an oil.

B. A mixture of 11 g. of the ethane described in A, with 8.0 g. of forty percent formalin, 24.0 g. of formic acid and 24 ml. of water was heated under reflux for thirty hours. The reaction mixture was diluted with 100 ml. of water and made alkaline with twenty percent sodium hydroxide solution. The product, 1-[p-(β-diethylaminoethoxy)phenyl]-1 - phenyl-2-(1-methyl-4-piperidyl)-ethane, was obtained as an oil which formed a dihydrochloride salt, melting at 221°–222° C.

This compound possesses anti-inflammatory activity.

EXAMPLE V

*1-[p-(β-Diethylaminoethoxy)Phenyl]-1-Cyclohexyl-2-p-Anisylethylene Methobromide*

Twenty grams of 1-[p-(β-diethylaminoethoxy)phenyl]-1-cyclohexyl-2-p-anisylethanol in methanol was mixed with ten grams of methyl bromide in methanol and placed in a pressure bottle. The pressure bottle was heated in an oven at 60° C. for three days. The solvent was removed under vacuum and the residue crystallized from ethanol-ethyl acetate yielding 1-[p-(β-diethylaminoethoxy)phenyl]-1-cyclohexyl-2-p-anisylethylene methobromide, melting at 148°–150° C. Apparently dehydration of the ethanol in this case was caused by the presence of some hydrogen bromide in the methyl bromide reagent.

We claim:

1. A compound of the formula:

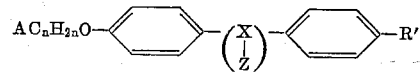

in which X is a radical of the group consisting of

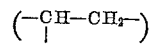

and

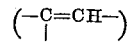

A is selected from the group consisting of dialkylamino in which the alkyl groups have from 1 to 4 carbon atoms, morpholino and piperidino, $n$ is an integer from 2 to 4 inclusive, R' is selected from the group consisting of hydrogen, lower alkyl, halogen and lower alkoxy, and Z is selected from the group consisting of piperidyl, N-methylpiperidyl and cyclohexyl.

2. 1 - [p-(β-diethylaminoethoxy)phenyl]-1-cyclohexyl-2-p-anisylethylene.

3. 1-[p-(β-diethylaminoethoxy)phenyl]-1-phenyl-2 - (1-methyl-4-piperidyl)ethylene.

4. 1 - [p - (β-diethylaminoethoxy)phenyl]-1-cyclohexyl-2-p-anisylethane.

5. 1-[p-(β-diethylaminoethoxy)phenyl]-1-phenyl - 2 - (1-methyl-4-piperidyl)ethane.

6. 1 - [p-(β-diethylaminoethoxy)phenyl]-1-cycylohexyl-2-p-anisylethylene methobromide.

No references cited.